United States Patent Office 3,427,062
Patented Feb. 11, 1969

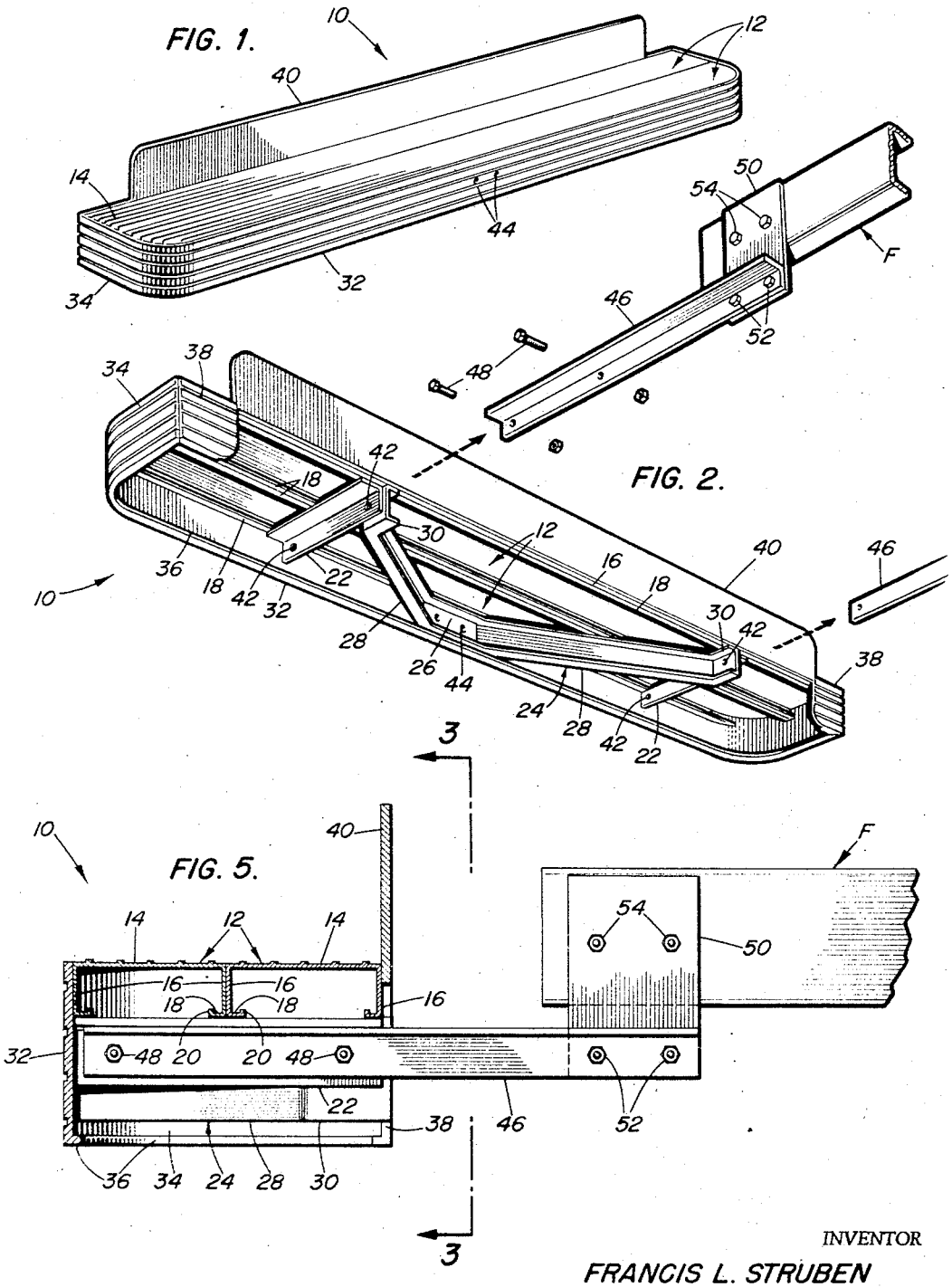

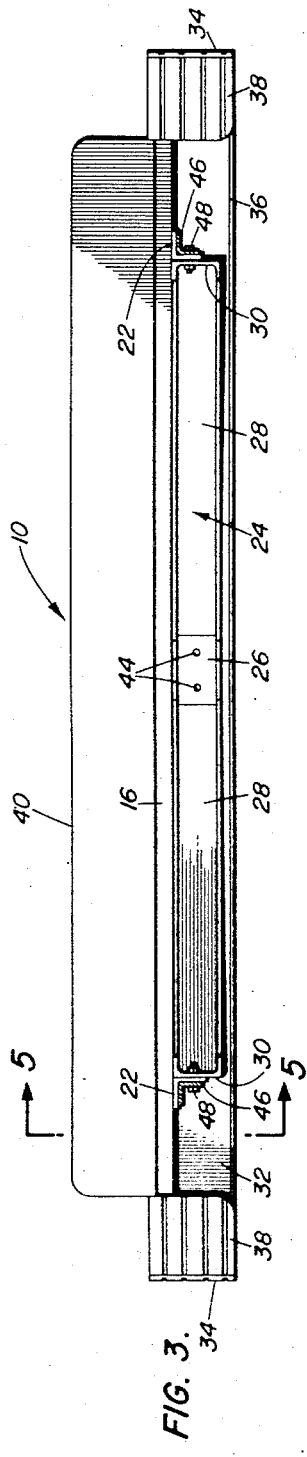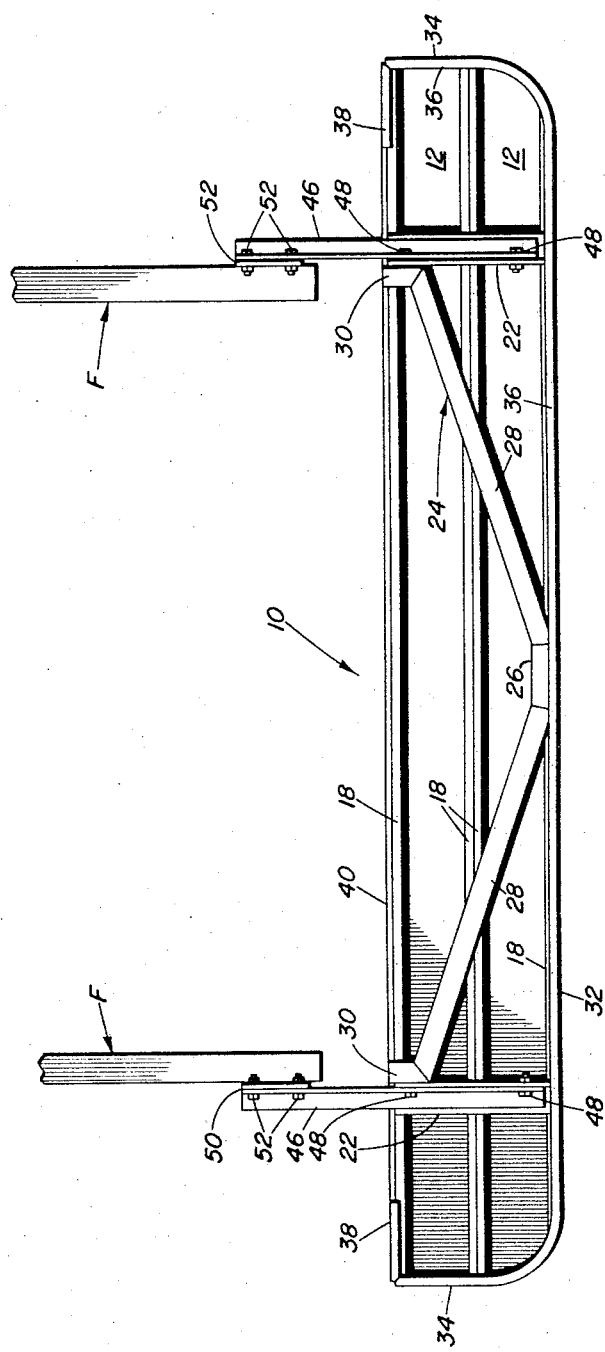

3,427,062
ALUMINUM BUMPER WITH HORIZONTAL STEP PORTION
Francis L. Struben, Baltimore, Md., assignor to The Silver Top Manufacturing Company, Inc., White Marsh, Md., a corporation of Maryland
Filed Nov. 17, 1967, Ser. No. 683,932
U.S. Cl. 293—69   4 Claims
Int. Cl. B60r 19/04, 21/14, 3/00

ABSTRACT OF THE DISCLOSURE

A light metal bumper type accessory of aluminum for road vehicles is disclosed. Use is made of extruded forms utilizing the flanges thereof to gain added strength. This together with a one-piece diagonal brace structure forms an extended step as well as an adequate bumper.

---

This invention relates generally to vehicles, and more particularly it pertains to a combination bumper and step for an automotive vehicle.

In the past, rear loading vehicles such as light trucks, station wagons and camper vans have either not been provided with a personnel step at the loading position or it has been an adequate sheet metal appendage to the regular bumper.

A loading operator is thus forced to either take a giant step directly from the vehicle or trust his weight to the narrow bumper or its sheet metal overlay. Some attempts have been made to provide a hook-on staircase but it obstructs the functioning of the regular bumper upon vehicles to which it is fastened.

It is an object of this invention, therefore, to provide as an article of commerce a combination bumper and personnel step for vehicles which because of light weight design is suitable for substantial extension beyond the vehicle frame.

Another object of this invention is to provide a light weight all metal bumper-step construction which will withstand severe use.

Other objects and attendant advantages of this invention will become more readily apparent and understood from the following detailed specification and accompanying drawings in which:

FIG. 1 is a perspective view of a novel bumper step of this invention incorporating features thereof as viewed from the rear oblique;

FIG. 2 is a partially exploded perspective view from the opposite direction of FIG. 1 showing the underside;

FIG. 3 is a front elevation viewed in the direction of the arrows 3—3 of FIG. 5;

FIG. 4 is a bottom plan view; and

FIG. 5 is a cross-section taken on the line 5—5 of FIG. 3 and viewed in the direction of the arrows.

Referring now to the details of the invention as shown in FIG. 1, reference numeral 10 indicates generally an all-welded rear bumper-step assembly. This bumper-step has two tread members 12 of extended, generally channel shape aluminum in side by side contact.

Each member 12 has a ribbed upper surface 14 and integral side flanges 16, as shown in FIG. 5. These side flanges 16 terminate in horizontal bottom flanges 18, serving as support feet as will be related, and a short vertical flange 20 at their ends gives added strength.

The feet or bottom flanges 18 are fastened upon a pair of spaced cross members 22 as best shown in FIG. 2. These cross members 22 of L section material are abutted on their inner sides by short longitudinal legs 30 of a diagonal bracing member 24 of general channel cross-section. The two diagonal portions 28 of the bracing member 24 are joined in continuation by a rearward lateral portion 26 co-extensive with the rearmost flange 16 of the rear tread member 12.

So located, this portion 26 abuts the inside of an extruded wrap-around apron 32. This apron 32 extends with a smooth curve into end portions 34 with the rear tread member 12 cut away suitably to accommodate the radius thereof as best shown in FIGS. 2 and 3. Short front corner aprons 28 are attached at right angles to the end portions 34 and are made of the same stock which includes a bottom flange 36 as best shown in FIG. 5.

A kick plate 40 is secured to and extends upwardly from the front flange 16 of the forward tread member 12 to complete the step arrangement portion.

A pair of spaced holes 44 are provided through the lateral portion 26 of bracing member 24 with these holes extending through the wrap-around apron 32 for the possible attachment of a trailer hitch, not shown.

Another pair of apertures 42 are provided through each cross member 22 (and the abutting leg 30) for attaching extension beams 46 of channel material using fasteners 48 as shown in FIGS. 2, 4, and 5. These beams 46 support the bumper step 10 at a substantial distance rearwardly from the vehicle (not shown) and attach to the frame F thereof with a depending hanger plate 50 and fasteners 52 and 54 both in spaced pairs.

Cantilevered in this manner, the light-weight construction of the bumper step does not affect the vehicle rear wheel loading to any appreciable extent, with the location thereof being more convenient than heretofore, and the combination of flange elements, brace and cross members form a structure well capable of rough service as a bumper. Furthermore, the design is well adapted to all welded construction from readily available structural and extruded shapes which are now available in light metal.

Obviously many modifications and variations of the present invention are possible in light of the above teachings.

What is claimed is:

1. A light-weight all-welded combination rear-bumper and step assembly for automotive vehicles comprising: a tread surface having rounded rear corners and a pair of ribbed adjacently disposed channels having downturned flanges terminating in inwardly turned horizontal flanges; an extruded, ribbed, wraparound apron relatively deeper than said channels, and encompassing the rear and side edges and a portion of the forward edge of the tread surface; an upstanding kickplate attached to and bridging the forward edge of the kickplate between the ends of the wrap-around apron; a pair of angular cross members abutting the wrap-around apron connecting all said horizontal channel flanges, each said cross member having a forward and a rearward aperture; and a diagonal bracing member abutting all said wrap-around apron and cross members and having an aperture in correspondence with each said cross member forward aperture.

2. A light-weight all-welded combination rear-bumper and step assembly for automotive vehicle as recited in claim 1, and a bolted assembly including a pair of extension bears adapted respectively to engage the said cross member apertures and provided at the respective forward ends with hanger plates whereby the said assembly is adapted for affixation to the frame of an automotive vehicle.

3. A light-weight all-welded combination rear-bumper and step assembly for automotive vehicles as recited in claim 2, wherein the said wrap-around apron has a pair of holes centrally disposed in the rearward edge, thereby adapting said assembly to mount a trailer hitch.

4. A light-weight all-welded combination rear-bumper and step assembly for automotive vehicles as recited in claim 3, wherein the said assembly is constructed of aluminum.

References Cited

UNITED STATES PATENTS

| | | | |
|---|---|---|---|
| 1,612,948 | 1/1927 | Shaw | 293—98 |
| 2,438,578 | 3/1948 | Runyan | 293—70 |
| 2,492,914 | 12/1949 | Barden | 293—69 XR |
| 2,604,349 | 7/1952 | Martnetz | 293—98 X |
| 2,649,308 | 8/1953 | Brice | 293—69 X |
| 3,318,617 | 5/1967 | Burns | 293—69 X |

ARTHUR L. LA POINT, *Primary Examiner.*

HOWARD BELTRAN, *Assistant Examiner.*

U.S. Cl. X.R.

293—70, 98